United States Patent
Yates et al.

(10) Patent No.: US 8,055,396 B2
(45) Date of Patent: Nov. 8, 2011

(54) LANDING LOAD MONITOR FOR AIRCRAFT LANDING GEAR

(75) Inventors: Michael Stuart Yates, Bristol (GB); Philip Gregory Keen, Bristol (GB)

(73) Assignee: Airbus Operations Limited, Bristol (GB)

( * ) Notice: Subject to any disclaimer, the term of this patent is extended or adjusted under 35 U.S.C. 154(b) by 952 days.

(21) Appl. No.: 11/989,785

(22) PCT Filed: Aug. 23, 2006

(86) PCT No.: PCT/GB2006/003154
§ 371 (c)(1),
(2), (4) Date: Jan. 31, 2008

(87) PCT Pub. No.: WO2007/023280
PCT Pub. Date: Mar. 1, 2007

(65) Prior Publication Data
US 2010/0161174 A1    Jun. 24, 2010

(30) Foreign Application Priority Data
Aug. 24, 2005  (GB) .................... 0517351.3

(51) Int. Cl.
*B64C 25/10* (2006.01)
(52) U.S. Cl. ............... 701/16; 701/3; 244/202; 244/203; 244/100 R; 244/102 R; 340/960
(58) Field of Classification Search .......... 701/3, 16; 244/202, 203, 100 R, 102 R; 340/960
See application file for complete search history.

(56) References Cited

U.S. PATENT DOCUMENTS

| 3,517,550 | A | | 6/1970 | Leventhal |
| 3,712,122 | A | | 1/1973 | Harris et al. |
| 4,749,152 | A | * | 6/1988 | Veaux et al. ............ 244/104 FP |
| 5,214,586 | A | | 5/1993 | Nance |
| 5,511,430 | A | | 4/1996 | Delest et al. |
| 5,548,517 | A | | 8/1996 | Nance |
| 6,032,090 | A | | 2/2000 | Von Bose |
| 6,120,009 | A | * | 9/2000 | Gatehouse et al. ........ 267/64.11 |
| 6,676,075 | B2 | | 3/2003 | Cowan et al. |

(Continued)

FOREIGN PATENT DOCUMENTS

GB    2 014 731    8/1979

(Continued)

OTHER PUBLICATIONS

International Search Report for PCT/GB2006/003154 mailed Nov. 27, 2006.
Great Britain Search Report for GB 0517351.3 dated Oct. 31, 2005.
Written Opinion of the International Searching Authority.

*Primary Examiner* — Paul N Dickson
*Assistant Examiner* — Nicole Verley
(74) *Attorney, Agent, or Firm* — Nixon & Vanderhye P.C.

(57) ABSTRACT

A landing gear monitor for aircraft landing gear including a plurality of pairs of wheels on a bogie, in which the main strut oil pressure serves to indicate landing load and is monitored in relation to, respectively, the two-wheel mode and the four-wheel mode, the two-wheel mode being the condition when a first of the plurality of pairs of wheels on the bogie contacts the ground and the four-wheel mode being the condition of a first and a second of the plurality of pairs of wheels on the bogie being in full contact with the ground.

21 Claims, 9 Drawing Sheets

U.S. PATENT DOCUMENTS

| | | | |
|---|---|---|---|
| 6,575,405 B2 * | 6/2003 | Bryant et al. | 244/102 SL |
| 6,671,588 B2 * | 12/2003 | Otake et al. | 701/3 |
| 6,722,610 B1 * | 4/2004 | Rawdon et al. | 244/103 W |
| 2007/0006652 A1 * | 1/2007 | Weldon et al. | 73/579 |
| 2007/0069072 A1 * | 3/2007 | Luce | 244/104 FP |
| 2008/0033607 A1 * | 2/2008 | Zeliff et al. | 701/29 |

FOREIGN PATENT DOCUMENTS

| | | |
|---|---|---|
| WO | 93/16359 | 8/1993 |

* cited by examiner

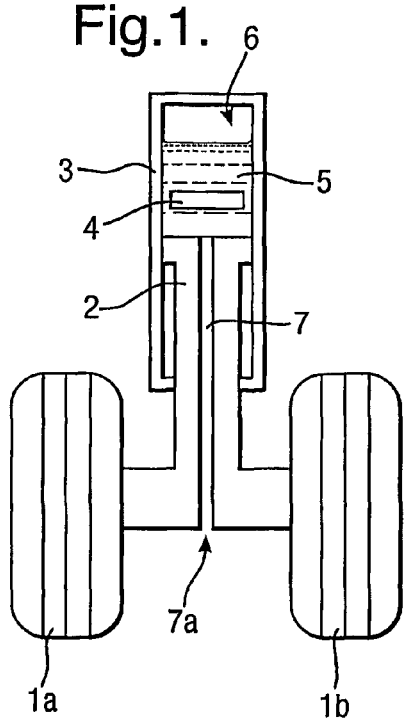
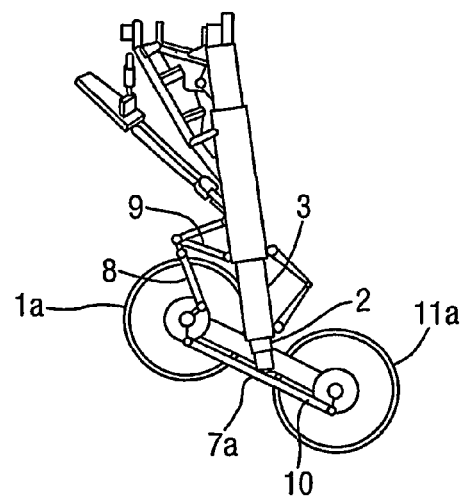
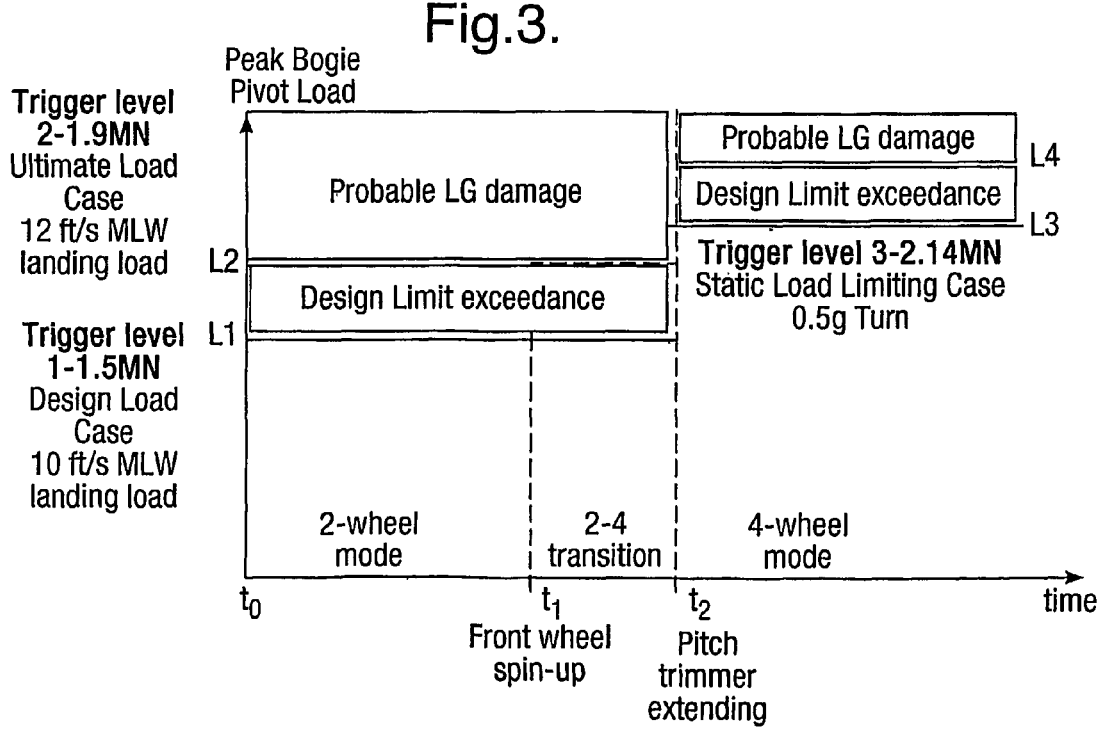

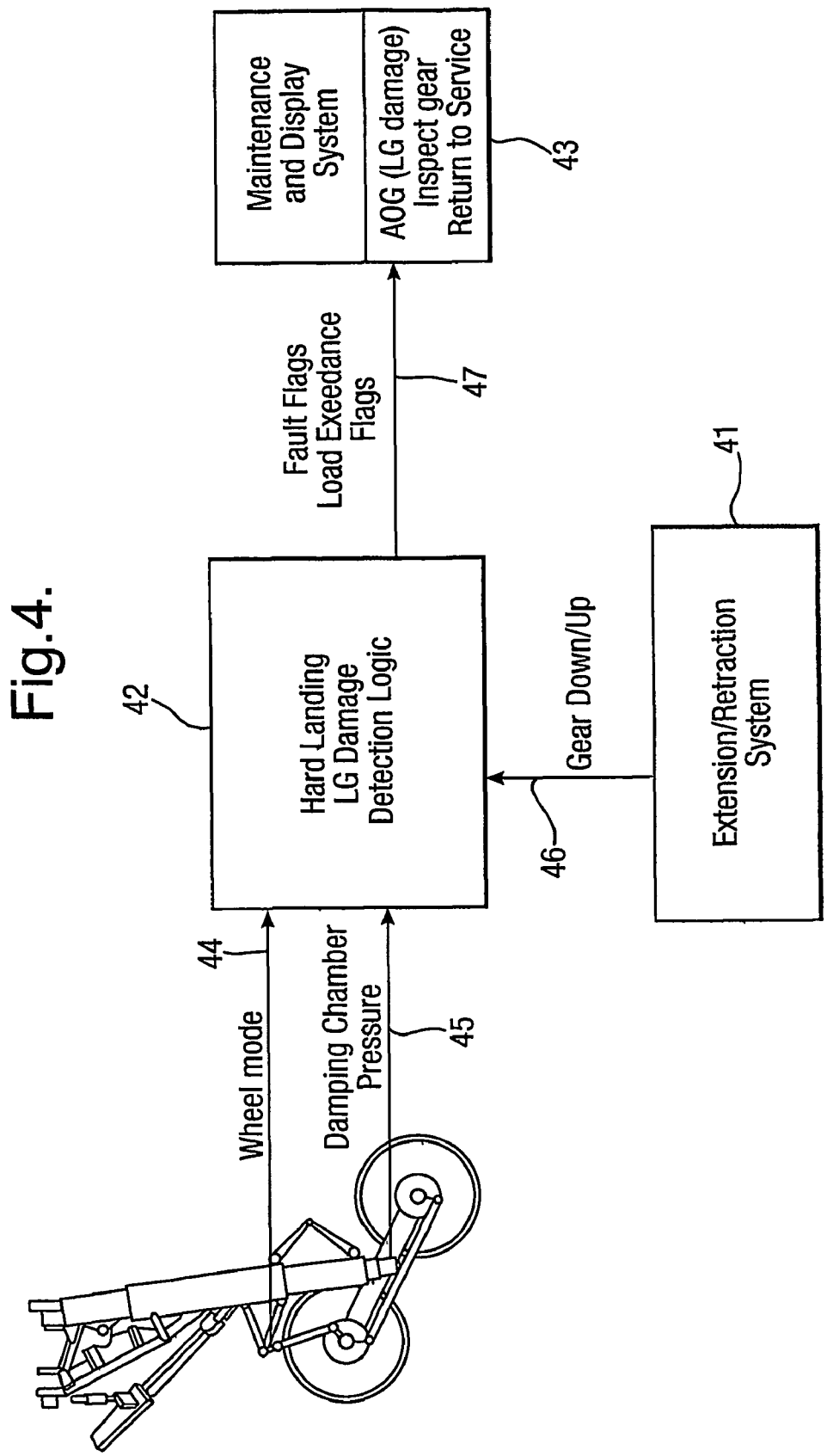

LANDING LOAD MONITOR FOR AIRCRAFT LANDING GEAR

This application is the U.S. national phase of International Application No. PCT/GB2006/003154 filed 23 Aug. 2006 which designated the U.S. and claims priority to 0517351.3 filed 24 Aug. 2005, the entire contents of each of which are hereby incorporated by reference.

The invention relates to an aircraft landing gear loads monitor.

An aircraft is required to land under many conditions which present a range of different loading conditions for the aircraft undercarriage and, under some conditions, a hard landing may occur, potentially causing damage to the aircraft undercarriage. Currently, hard landings are reported in a variety of ways, for instance by the pilot or, in some aircraft, a report is initiated by a triggering event which occurs when, for instance, the measurement of the descent rate of the aircraft or the acceleration of the aircraft centre of gravity during landing exceeds a certain value. Reports of hard landings by any method result in a significant maintenance and operational burden to an airline because of the consequential need for post-landing inspection, with the resulting delay and disruption, all of which mean additional costs.

A report of a hard landing usually leads to subsequent more searching investigations into the loading conditions of the aircraft undercarriage on the basis of a wider range of collected flight information than that used in reaching the initial "hard landing" assessment (Flight Data Analysis). This subsequent Flight Data Analysis investigation is, of course, time consuming because it takes account of the loads on an individual landing gear due, for example, to a bounced landing, low lift-to-weight, rolling or a rolled aircraft.

An aircraft landing gear usually includes a cylindrical strut incorporating a telescopic shock-absorbing arrangement, in one form of which hydraulic fluid is forced through an orifice or orifices in an orifice plate within the cylindrical strut. Compressed nitrogen gas is present and provides resilience in the damping chamber. A plurality of circular seals trapped between the telescopic parts are used to retain the hydraulic fluid and compressed nitrogen gas in the cylindrical strut and the supply input port for the hydraulic fluid is usually sealed by a gland nut.

There are many types of landing gear and one type which has been over-stressed may suffer internal damage such as, for example, damage to the orifice plate, which cannot be easily detected. An alternative type of landing gear which has been overstressed may suffer external damage, for example, the permanent elongation of a component of the landing gear which is in tension during a landing, which can be readily detected.

One of the current detection methods, Flight Data Analysis, may be characterised as follows:
- it is based on the velocity and acceleration of the aircraft centre of gravity and not on individual landing gear conditions.
- the centre of gravity descent velocity is calculated from information from a nose-mounted radio altimeter and converted through a Kalman filter into descent velocity for the aircraft centre of gravity.
- data sampling takes place at a relatively low rate of once every 100 milliseconds, resulting in data latencies that create uncertainty as regards the timing and magnitude of events occurring in the contributing systems.
- triggering may occur at quite low landing gear loads, probably in order to accommodate aircraft structural requirements for a hard landing case, prompting the need for an evaluation of potential landing gear damage.
- there is no direct measurement of landing gear loading, there is instead reliance on descent velocity and acceleration, making an accurate result for landing gear loading dependent on aircraft mass.
- touch-down detection relies on detecting wheel spin-up, resulting in too much latency to detect accurately the instant of touch-down.
- no immediate confirmation is provided of a landing gear load limit being exceeded, reliance being placed instead on the post-processing of relevant information for the detection of a hard landing.
- logic operations detect book-case limits which are the cases which experience has shown to give rise to the highest loads on the landing gear, rather than real landing conditions with varying lift-weight ratios, rolling and rolled aircraft.
- in the case of an articulated four-wheel bogie, the logic operations do not take account of the separable loadings for the two-wheel and four-wheel phases during a landing.

The correct determination of landing gear loads is made more problematical where the landing gear is of the type which has a pivotable bogie attached to the lower end of a landing gear leg and where the bogie has two or more pairs of wheels attached to the bogie. It is often advantageous that such landing gears are held in a position just before landing and in the final stages of take-off where the bogie is pivoted such that the foremost pair of wheels is higher in relation to the ground than the rearmost pair of wheels. This may be called the trail position and in this position the bogie is inclined at an angle to the ground surface. However, whilst the wheels are fully engaged with the ground the bogie is generally aligned with the ground surface.

The invention provides a landing gear monitor for aircraft landing gear including a plurality of pairs of wheels on a bogie, including:

a pressure sensor which, in use, is so located in the landing gear main strut damping chamber as to sense the pressure of the hydraulic fluid in the landing gear main strut, the pressure sensor providing an output electrical signal corresponding to the pressure it senses, a first landing gear sensor for sensing and signalling that the landing gear is lowered, a second landing gear sensor for sensing and signalling the on-set of a first mode of operation of the bogie when the bogie is in the trail position such that a first of the plurality of pairs of wheels on the bogie will contact the ground first, a third landing gear sensor for sensing and signalling the on-set of a second mode of operation of the bogie when a second of the plurality of pairs of wheels on the bogie, in addition to the first pair of wheels, are fully engaging with the ground, a signal processing unit connected to receive the signals from all of the sensors and, following the receipt of a signal from the first landing gear sensor indicating that the landing gear is lowered, the signal processing unit, in operation, evaluating the signals from the pressure sensor in relation to, respectively, the first mode and the second mode, and providing a main output signal indicating the results of the evaluation, and an output section connected to receive the main output signal from the signal processing unit, for providing a representation of the output signal from the signal processing unit in relation to, respectively, the first mode and the second mode.

Preferably, the signal processing unit includes internally stored information representing a first limiting magnitude for the signal from the pressure sensor during operation of the landing gear in the first mode, and the signal processing unit provides a first additional output signal indicative of the magnitude of the signal from the pressure sensor during the first mode relative to the first limiting magnitude.

Preferably, the signal processing unit includes internally stored information representing a second limiting magnitude, exceeding the first limiting magnitude, for the signal from the pressure sensor during operation of the landing gear in the first mode, and the signal processing unit provides a second additional output signal indicative of the magnitude of the signal from the pressure sensor during the first mode relative to the second limiting magnitude.

Preferably, the signal processing unit continues to provide the second additional output signal indicative of the magnitude of the signal from the pressure sensor during the third mode relative to the second limiting magnitude.

Preferably, the signal processing unit includes internally stored information representing a third limiting magnitude for the signal from the pressure sensor during operation of the landing gear in the second mode, and the signal processing unit provides a third additional output signal indicative of the magnitude of the signal from the pressure sensor during the second mode relative to the third limiting magnitude.

Preferably, the signal processing unit includes internally stored information representing a fourth limiting magnitude, exceeding the third limiting magnitude, for the signal from the pressure sensor during operation of the landing gear in the second mode, and the signal processing unit provides a fourth additional output signal indicative of the magnitude of the signal from the pressure sensor during the second mode relative to the fourth limiting magnitude.

In one arrangement, the limiting magnitudes are derived from a computer model of the landing gear.

Preferably, the signal processing unit so operates as to capture the peak value of the signal from the pressure sensor in the first mode.

Preferably, the signal processing unit so operates as to capture the peak value of the signal from the pressure sensor in the second mode.

Preferably, the signal processing unit so operates as to capture the peak value of the signal from the pressure sensor in the first mode, and the output section so operates as to provide a representation of the peak value of the signal from the pressure sensor in the first mode in relation to the first and second limiting magnitudes.

Preferably, the signal processing unit so operates as to capture the peak value of the signal from the pressure sensor in the second mode, and the output section so operates as to provide a representation of the peak value of the signal from the pressure sensor in the second mode in relation to the third and fourth limiting magnitudes.

In one arrangement, the signal processing unit, in operation, provides a main output signal, from the signal from the signal processing unit, representing the load to which the landing gear main strut is subjected.

The main output signal and the limiting magnitudes may be displayed together, in which case the significant information is the peak magnitude of the main output signal in relation to the limiting magnitudes and the displayed information need not represent any specific units of measurement.

Preferably, the signal processing unit includes a first look-up table relating the magnitude of the signal from the pressure sensor to the load to which the landing gear is subjected in the first mode and the main output signal from the signal processing unit is derived from the information provided by the first look-up table.

Preferably, the signal processing unit includes a second look-up table relating the magnitude of the signal from the pressure sensor to the load to which the landing gear is subjected in the second mode and the main output signal from the signal processing unit is derived from the information provided by the second look-up table.

In one arrangement, the signal processing unit samples the signal from the pressure sensor at intervals of about 20 milliseconds. A slightly higher or lower sampling rate would also serve the required purpose of effectively capturing peak values.

A landing gear monitor in accordance with the invention is suitable for and operable with a four-wheel bogie.

In one arrangement, a landing gear articulation sensor performs the functions of the second and third landing gear sensors.

Advantageously, an aircraft landing gear including a landing gear monitor in accordance with the invention includes a built-in indicator of the loading to which the landing gear is subjected during operation of the aircraft equipped with the landing gear.

Advantageously, an aircraft including a landing gear monitor in accordance with the invention includes a built-in indicator of the loading to which its landing gear is subjected during the operation of the aircraft.

Preferably, the landing gear monitor is controlled by a computer program, for example recorded on a carrier.

The invention also provides a method of operation of a landing gear monitor for aircraft landing gear including a plurality of pairs of wheels on a bogie, including:

sensing the pressure of the hydraulic fluid in the landing gear main strut and providing an output electrical signal corresponding to the sensed pressure, sensing and signalling that the landing gear is lowered, sensing and signalling when the bogie is in the trail position, the condition of the bogie being in the trail position being identified hereinafter as the first mode, sensing and signalling when a second of the plurality of pairs of wheels on the bogie, in addition to the first pair of wheels, fully engages with the ground, the condition of a first and a second of the plurality of pairs of wheels on the bogie fully engaging with the ground being identified hereinafter as the second mode, evaluating the signals from the sensing of the pressure of the hydraulic fluid in relation to, respectively, the first mode and the second mode, and providing a main output signal indicating the results of the evaluation, and providing a representation of the main output signal in relation to, respectively, the first mode and the second mode.

Advantageously, the landing gear monitor is programmed to operate in accordance with the above method.

The invention is a device which, in operation, indicates when the load limit for a particular landing gear has been exceeded during a landing and alerts aircrew and maintenance crew to the need for either maintenance action on or repair of the landing gear. The device also indicates when load limits for the landing gear have not been exceeded, thereby avoiding unnecessary action in relation to the landing gear.

The device monitors the pressure of the damping chamber in the shock absorber, providing an indication of the peak load to which the shock absorber body is subjected, the peak load on the shock absorber, in turn, indicating the peak load to which the landing gear is subjected. The device provides a direct indication of the peak load experienced by a particular landing gear, whatever the operational mode of the aircraft. Using the information provided by the device, an objective decision can be made as to whether the landing gear should be inspected, repaired or left in service, eliminating inspection and, possibly, comprehensive analysis of flight data where such action is not required, thereby avoiding avoidable aircraft delays or cancellations.

For an articulated landing gear, that is, one with four wheels in which touch-down commences with two wheels contacting the ground followed by forward rotation of the bogie to bring all four wheels into contact with the ground, a mode indicator is included for relating the landing gear peak loads to, respectively, the period when only two wheels are in contact with the ground and the period when all four wheels are firmly in contact with the ground.

Viewed broadly, the invention provides a landing gear monitor for aircraft landing gear, including:

a pressure sensor which, in use, is so located in the landing gear main strut as to sense the pressure of the hydraulic fluid in the landing gear main strut damping chamber, the pressure sensor providing an output electrical signal corresponding to the pressure it senses, a landing gear sensor for sensing and signalling that the landing gear is lowered, a signal processing unit connected to receive the signals from all of the sensors and, following the receipt of a signal from the landing gear sensor indicating that the landing gear is lowered, the signal processing unit, in operation, evaluating the signals from the pressure sensor and an output section connected to receive the main output signal from the signal processing unit, for providing a representation of the output signal from the signal processing unit.

An aircraft landing gear monitor in accordance with the invention will now be described by way of example only with reference to the accompanying drawings, in which:

FIG. 1 is a diagrammatic representation of a front view of an aircraft landing gear, including an articulated four-wheel bogie, showing the front two wheels and an arrangement of the support members of the landing gear, including a main structural member which is, in effect, a telescopic shock absorber;

FIG. 2 is a diagrammatic representation of a side view of the aircraft landing gear of FIG. 1 without the front and rear wheels nearest the viewer, to show the bogie beam that lies between the wheels;

FIG. 3 is a diagrammatic representation of landing gear load limits in relation to time, during a landing;

FIG. 4 is a block diagram representation of an electrical apparatus for monitoring landing gear load;

Figure 5:
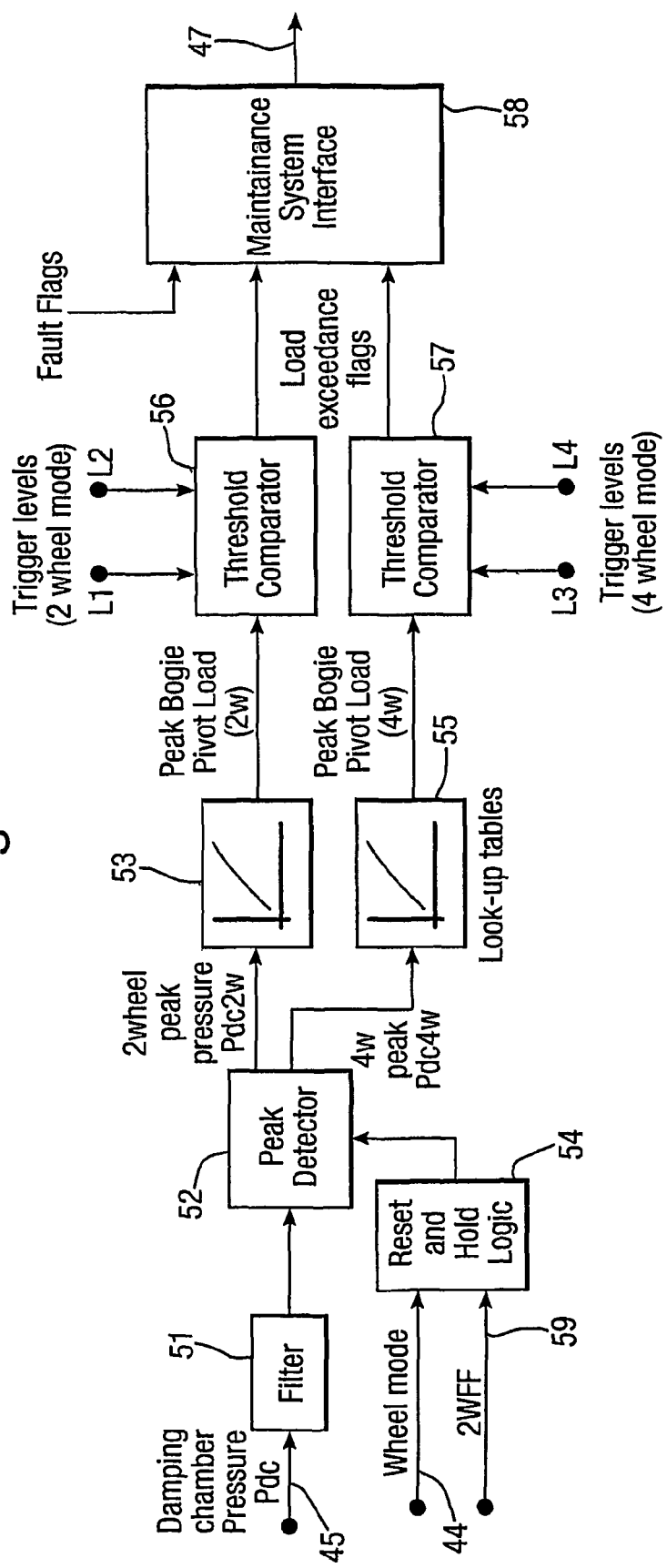
FIG. 5 is a more detailed representation than FIG. 4 of the load monitoring logic element of the electrical apparatus for monitoring landing gear load.

In the following description, the first mode of operation of the bogie is called the two-wheel mode, and the second mode of operation of the bogie is called the four-wheel mode.

Referring to FIG. 1 of the accompanying drawings, the front two wheels 1a and 1b of an aircraft landing gear including an articulated four-wheel bogie are shown, the bogie being pivotally attached to an inner main member 2 which is movable axially within an outer main member 3. The inner main member 2 and the outer main member 3 together form a telescopic shock absorber, the outer main member 3 being a cylinder closed at one end and the inner main member 2 including a plurality of circular seals (not shown) which serve to trap a volume of hydraulic fluid 5 between the inner main member 2 and the outer main member 3. An orifice plate 4 that includes an orifice or a plurality of orifices is positioned within the outer main member 3 at a position where hydraulic fluid being pushed into the outer main member 3 by the inner main member 2 is driven through the orifice plate 4. A volume of nitrogen gas 6 is contained in the outer main member 3 and serves to provide resilience as the inner main member 2 is forced into the outer main member 3. The inner main member 2 includes a hydraulic fluid fill point 7a leading to an axial passage 7 through the inner main member 2, permitting the injection of hydraulic fluid into the outer main member 3. The hydraulic fluid fill point 7a serves as the filling point for the damping chamber in the outer main member 3 and, being readily accessible, can serve as a monitoring port for damping chamber oil-pressure.

The hydraulic fluid fill point 7a is made to serve as a monitoring port for damping chamber oil-pressure by the introduction of a suitably robust pressure transducer of relatively high bandwidth at the hydraulic fluid fill point 7a. With the introduction of such a transducer, an electrical signal from the pressure transducer provides an indication of damping chamber oil-pressure, for use by an apparatus monitoring damping chamber oil pressure which, in turn, serves as an indication of the loading of the landing gear.

A suitable pressure transducer is one of the Druck PMP/PTX 3000 Series amplified aerospace pressure transducers.

In the operation of the shock absorber represented by FIG. 1, the nitrogen gas, in compression, acts as a spring. The pressure $P_g$ of the nitrogen gas provides the main reaction to the static loading of the shock absorber. Under dynamic conditions, when the shock absorber is being compressed, hydraulic fluid is forced from the damping chamber into the chamber occupied by the nitrogen gas, through the fixed orifice plate 4. Consequently, a pressure drop occurs across the orifice plate 4 as the shock absorber is compressed. The pressure drop $\Delta P_o$ is proportional to the square of the hydraulic fluid velocity V and may be expressed as:

$$\Delta P_o = K_d \times V^2,$$

where $K_d$ is a constant.

The pressure $P_{dc}$ in the damping chamber occupied by the hydraulic fluid is then expressed as:

$$P_{dc} = P_g + \Delta P_o.$$

The pressure $P_{dc}$ multiplied by the internal cross-sectional area of the inner main member 3 of the shock absorber is equal to the force being transmitter vertically through the main strut formed by the inner main member 2 and the outer main member 3, less the friction force resulting from the circular seals between the inner main member 2 and the outer main member 3. The static frictional force resulting from the circular seals between the inner main member 2 and the outer main member 3 is necessarily large and therefore transfers a significant part of the landing gear load from the inner main member 2 to the outer main member 3, so the damping chamber pressure does not provide a reliable indication of landing gear load when the aircraft is static. However, the conditions during a landing are dynamic conditions in which the frictional force due to the circular seals is reduced to sliding friction. The peak forces developed in the landing gear occur at the highest velocities V of the hydraulic fluid and the dynamic friction force at those velocities is small compared with the damping force due to the orifice square law. It follows that, during a landing, the conditions in the landing gear are such that the damping chamber peak pressure is a good indicator of the peak load in the main strut of the landing gear.

The above analysis is valid for any shock absorber that includes a gas-hydraulic fluid arrangement as described in relation to FIG. 1. The load experienced by the shock absorber is passed on to other components of the landing gear, allowing the loading of selected components or, possibly, all components, to be determined. Of course, landing gear geometries are not all the same and the loads experienced by the components are dependent on the particular landing gear geometry.

Referring to FIG. 2 of the accompanying drawings, a side view of the landing gear represented by FIG. 1, without the front and rear wheels nearest the viewer, shows the landing gear as including, the front wheel 1a and its corresponding rear wheel 11a and, in addition to the elements 2 to 7 shown in FIG. 1, an articulation link 8, a pitch trimmer 9 and a bogie beam 10 at the ends of which lie the wheels 1a and 11a.

The articulation link 8 connects the front of the bogie to the outer main member 3. When the landing gear is lowered with the aircraft airborne, the articulation link 8 acts to support the bogie, holding the four-wheel bogie tilted front-up when the shock absorber formed by the inner main member 2 and the outer main member 3 is extended.

The landing gear arrangement represented by FIG. 2 may be called either a rocking bogie landing gear or an articulated landing gear. During a landing on an articulated landing gear, first of all the rear wheels of the bogie touch down and, when the landing gear oleo is compressed sufficiently, the front wheels of the bogie also touch down. The condition of only two wheels in contact with the ground will be referred to as the two-wheel mode and the condition of all four wheels in full contact with the ground will be referred to as the four-wheel mode. The condition between the two-wheel and four-wheel modes will be referred to as the two-to-four-wheel transition mode.

The articulation link 8 acts as a fulcrum during initial touchdown, that is, in the two-wheel mode, when the two lower wheels alone are in contact with the ground, the articulation link 8 being in tension as the oleo is compressed. In the two-wheel mode, the articulation link 8 experiences a tensile load that is a proportion (about half) of the compressive load transmitted through the oleo, the particular proportion being dependent on the landing gear geometry. The load on the articulation link 8 is dependent on the bogie pivot load, which is the load acting vertically on the lower end of the landing gear leg where the bogie is pivoted, which in turn is dependent on the rear wheel load.

The pitch trimmer 9 includes a member that connects the oleo to the front of the bogie and becomes extended when the bogie moves from the initial touch-down condition of two wheels in contact with the ground, through the transition mode, to the final touch-down condition of four wheels in contact with the ground. A pitch trimmer position sensor (not shown) performs the function of detecting the three phases in a touch-down, the three phases being (i) only the two lower wheels in contact with the ground, (ii) the two lower wheels in contact with the ground and the two upper wheels making first contact with the ground and (iii) four wheels in full contact with the ground.

The load in the articulation link 8 changes from being a tensile load to being a compressive load during the transition mode. Once the landing gear is in the four-wheel mode, the articulation link 8 is no longer in compression and the forces from both the front and rear wheels of the bogie are transmitted through the oleo.

The landing gear represented by FIGS. 1 and 2 is subject to significant shock during a landing and thresholds may be set, relevant to the two-wheel mode, the transition mode and the four-wheel mode, respectively, classifying landings in relation to landing gear load. For example, a landing may be classified as being within the landing load limit or exceeding the landing load limit.

An expectation is that the articulation link 8 has a design limit load case of withstanding up to a symmetrical 10 ft/second landing, whereas analysis of landing gear loading taking account of a range of possible landing conditions shows that there are many cases where the design limit load for the articulation link 8 can be exceeded at lower descent rates. The inconsistency is resolved by the direct measurement of the bogie pivot load which can then be used to determine the loading of other components, including the loading of the articulation link 8, the loading of which depends on the loading at the bogie pivot.

Additionally, the landing gear has to be designed to withstand several design limit load cases, one of which may be a 0.5 g turn in the four-wheel mode, whilst taxiing. A design limit load case of a 0.5 g turn whilst taxiing is sometimes considered to represent a loading threshold that is unlikely to be exceeded under any other condition, whereas analysis of landing gear loading shows that the design limit load for a 0.5 g turn can be exceeded in the four-wheel mode, during landing, at low descent rates and low lift-to-weight ratios. Also, the loading threshold equivalent to a 0.5 g turn in the four-wheel mode may well exceed design loading limits in the two-wheel mode leading potentially to damage to the articulation link, and the invention recognises a need for different thresholds for the four-wheel and two-wheel modes.

FIG. 3 of the accompanying drawings is a graphical representation of landing load thresholds for landing gear, measured at the bogie pivot and the shock absorber.

Referring to FIG. 3, the time $t_0$ represents the commencement of touchdown, at which time the trailing pair of wheels alone begins to be loaded, that is, the commencement of the two-wheel mode. Some time later, at the time $t_1$ shown in FIG. 3, the leading pair of wheels of the bogie begins to be loaded along with the trailing pair of wheels, that is, the two-to-four-wheel transition mode, that condition continuing up to the time $t_2$ shown in FIG. 3. Thereafter, both pairs of wheels of the bogie are loaded, that is, the four-wheel mode, the aircraft having landed.

A landing load marked by the level labelled L1 is a safe landing load threshold during the period between $t_0$ and $t_1$ during which only the two lower wheels of the bogie are in contact with the ground and a landing load of L1 continues to be a safe landing load during the period between the times $t_1$ and $t_2$ and up to the time $t_2$ corresponding to the two-to-four wheel transition, at the end of which all four wheels of the bogie are first in contact with the ground. Thereafter, from the time $t_2$ onwards, the higher landing load marked by the level L3 becomes the safe landing load limit, all four wheels of the bogie being fully in contact with the ground. The area bounded by the lines L1, $t_0$ and $t_2$ and the area beyond the line $t_2$ bounded by the line L3 represent safe operating areas for the landing gear.

A landing load above the level L1 of 1.5 MN, say, and below that marked by the level labelled L2 of 1.9 MN (say) is a landing load exceeding the safe landing load threshold during the period between the time $t_0$ and the time $t_2$ and, similarly, a landing load above the level L3 of 2.14 MN, say, and below that marked by the level labelled L4 is a landing load exceeding the safe landing load threshold during the time beyond $t_2$ when all four wheels are in full contact with the ground. Landing loads above the level L2 during the period between $t_0$ and $t_2$ and above the level L4 beyond the time $t_2$ are well in excess of the safe landing load thresholds and are likely to result in probable landing gear damage.

Referring to FIG. 4 of the accompanying drawings, an electrical apparatus for monitoring landing gear load is represented by a block 42 that includes a first input port 44, a second input port 45, a third input port 46 and an output port 47. The electrical apparatus 42 requires an electrical signal on its first input port 44 indicative of the landing gear being in a condition corresponding to the period between $t_0$ and $t_2$ or a time beyond $t_2$ of FIG. 3. The electrical apparatus 42 requires an electrical signal on its second input port 45 representing the oil pressure in the damping chamber of the shock absorber and requires an electrical signal on its third input port 46 indicative of the landing gear being up or down. The electrical apparatus 42 provides an output signal on its output port 47 indicative of the maximum landing gear load, for periods identified as corresponding to the operating modes of the landing gear. The output signal indicates the landing gear load as being below the level L1 of FIG. 3 for the period preceding the time $t_2$ and below the level L3 after the time $t_2$ of FIG. 3, or otherwise, in relation to the load levels L1 and L3 of FIG. 3.

The signals required for the first and second input ports 44 and 45 are obtained from the landing gear. The signal required for the first input port 44 is obtained by detecting the position of the pitch trimmer 9 of FIG. 2 and indicates the condition of the landing gear in relation to its three modes, referred to above. The signal required for the second input port 45 is obtained from an oil pressure transducer providing an indication of damping chamber oil-pressure, as discussed above. The signal provided on the third input port 46 comes from the landing gear extension and retraction system 41, indicating whether the landing gear is retracted or deployed. The signal on the output port 47 is applied to a display device 43, located in the aircraft cockpit. The signal on the output port 47 may, additionally, be transmitted to another or other devices including, for example, data recording means.

The input signals include the signal indicating the wheel mode and the signal indicating oleo damping chamber pressure. There is an interface with the landing gear extension and retraction system permitting self-checking and providing information on flight cycles. An output signal goes to the maintenance and display system and provides flag indications of a set load threshold being exceeded, from which can be determined the appropriate action including, for example, the grounding and inspection of an aircraft or its return to service. Fault flags are included to indicate that the load monitoring apparatus has detected a fault or faults in itself as a result of a self-check, to indicate to the maintenance system that it is faulty and to request maintenance action. A need for an aircraft-on-ground inspection or maintenance is communicated by way of the maintenance system independently of a Flight Data Analysis report.

The electrical monitoring apparatus effectively monitors the landing gear load directly through the sensing of the oil pressure in the damping chamber and is independent of key variables that affect landing gear load, for example, rolling, lift-to-weight ratio, mass and descent velocity of the aircraft. If a threshold, as set out in FIG. 3, is exceeded, then there is possible landing gear damage and the aircraft should remain grounded until appropriate maintenance action has been taken. If no threshold has been exceeded, there is unlikely to be landing gear damage and the aircraft is in a fit condition to continue being operated.

The electrical monitoring apparatus operates with a sample time of about 20 milliseconds in order to ensure that load peaks are captured and, also, conducts checks for loss of pressure measurement by:
  checking the landing gear hydraulic pressure during the approach, reports a fault if appropriate and continues to monitor the pressure,
  checking that the peak hydraulic fluid pressure is greater than the pressure when the landing gear is fully extended prior to landing and, if appropriate, reports a fault.

In addition, the electrical monitoring apparatus checks for the following:
  loss of an indication of two-wheel mode which may result in too high a threshold being applied and a consequent failure to indicate damage.
  loss of an indication of four-wheel mode—if there is uncertainty, then the lower two-wheel thresholds are applied.
  loss of power or computing effectiveness.

Bounce landings are catered for and the apparatus is provided with information indicating when a landing cycle is completed, for record keeping. The apparatus monitors the extension and the retraction of the landing gear for monitoring landing cycles, but always performs monitoring regardless of the landing gear being extended or retracted in order to ensure that the latest landing event is monitored.

Referring to FIG. 5 of the accompanying drawings, the load monitoring logic element of the electrical apparatus of FIG. 4 includes a filter 51, a peak detector 52, a first look-up table 53, a second look-up table 55, a reset-and-hold logic block 54, a first threshold comparator 56, a second threshold comparator 57 and an interface output circuit 58.

The reset-and-hold logic block 54 receives the signals on the first input port 44 indicating where the landing operation is, in relation to the times $t_0$, $t_1$ and $t_2$ of FIG. 3. An input signal on an additional input port 59, coming from the internal fault logic 64, enforces two-wheel mode thresholds. An output signal from the reset-and-hold logic block 54 goes to the peak detector 52 which receives the signal representing the oil pressure in the shock absorber damping chamber by way of the filter 51. The peak detector 52 provides a first output signal which is applied to the first look-up table 53 and is indicative of the peak load during the period $t_0$ to $t_2$ of FIG. 3. The peak detector also provides a second output signal which is applied to the second look-up table 55 and is indicative of the peak load during the period after the time $t_2$ of FIG. 3. The output of the first look-up table 53 is applied to the first threshold comparator 56 and the output of the second look-up table 55 is applied to the second threshold comparator. A first output signal from the first threshold comparator 56 and a second output signal from the second threshold comparator 57 are applied to the interface output circuit 58 which provides the output signal on the output port 47.

In the operation of the load monitoring logic element represented by FIG. 5, the filter 51 reduces high-frequency noise (over 100 Hz) that may be present in the signal representing the oil pressure in the damping chamber of the shock absorber. The reset-and-hold logic block 54 operates to ensure that electrical signals resulting from peak oil pressure readings for the respective period $t_0$ to $t_2$ and the period beyond $t_2$, of FIG. 3, are captured by the peak detector 52. The first look-up table 53 is used to convert the output signals from the peak detector 52 to pivot load values during the period $t_0$ to $t_2$ whereas the look-up table 55 is used to convert the output signals from the peak detector 52 to pivot load values for the period beyond $t_2$.

The output signals from the first look-up table 53 are applied to the first threshold comparator 56 which so operates as to detect input signals corresponding, respectively, to the load levels L1 and L2 of FIG. 3 and to provide an output signal indicating whether an input signal corresponds to a load that is below L1, between L1 and L2 or above L2. The output signals from the second look-up table 57 are applied to the second threshold comparator 57 which so operates as to detect input signals corresponding, respectively, to the load levels L3 and L4 of FIG. 3 and to provide an output signal indicating whether an input signal corresponds to a load below L3, between L3 and L4 or above L4. The output signals from the first comparator 56 and the second comparator 57 are applied to the interface output circuit 58 which provides an output signal which indicates which, if any, of the load limits L1, L2, L3 or L4 has been exceeded in relation to the period between $t_0$ and $t_2$ and the period beyond $t_2$ of FIG. 3.

In the operation of the apparatus, the value of peak oleo damping chamber pressure is converted into an electrical signal by means of a suitable fluid pressure to electrical signal transducer positioned in the oil fill point 7a, say, of FIG. 1, and the values of peak oleo damping chamber pressure and peak bogie pivot load are represented by corresponding values in the first look-up table 53 of FIG. 5, the output signals from the first look-up table 53 being the appropriate stored values representing peak bogie pivot load according to the input signals representing peak oleo damping chamber pressure during two-wheel mode.

The converted value of peak oleo damping chamber pressure from the fluid pressure to electrical signal transducer and the values of peak oleo damping chamber pressure and peak attachment point load are represented by corresponding values in the second look-up table 55 of FIG. 5, the output signals from the second look-up table 55 being the appropriate stored values representing peak attachment load according to the input signals representing peak oleo damping chamber pressure during four-wheel mode.

The signal from the transducer connected to sense the pressure of the damping chamber hydraulic fluid is sampled every 20 milliseconds, as is the signal indicating the wheel mode, and logic operations are executed at a rate corresponding to the 20 millisecond sampling period. The filter 51 reduces the very high frequency noise, that is, noise at over 100 Hz. The peak detector 52 captures the largest value of damping chamber pressure occurring during the two-wheel mode as $P_{dc}2W$ and the largest value occurring during the four-wheel mode as $P_{dc}4W$. The captured values are converted to peak loads and compared with the set trigger thresholds. The reset and hold element 54 ensures that the respective peak pressures associated with the two-wheel and four-wheel modes are captured and, in the event that the two-wheel mode indication is absent, the apparatus executes two-wheel mode operation throughout the landing cycle. The first look-up table 53 provides an indication of bogie pivot load against which a design limit can be compared for the two-wheel mode, and the second look-up table 55 provides a corresponding indication for the four-wheel mode. Similar look-up tables or algorithms may be provided in respect of specific components of the landing gear such as the articulation link. Monitoring continues in the four-wheel mode until a gear-up cycle occurs. The apparatus also reports on vertical load conditions and, therefore, the occurrence of a load exceeding such a load during ground maneuvering. In the event of a bounce landing, the monitoring switches between modes from 2 to 4 to 2 and back to 4 as necessary, continuing to monitor the highest value for that mode, regardless of the sequence of events.

The reset and hold element 54 ensures that $P_{dc}2W$ is updated only during the two-wheel mode and held during the four-wheel mode. Also, the $P_{dc}4W$ is updated only during the four-wheel mode while $P_{dc}2W$ is held. The values and fault flags are maintained in a non-volatile memory (NVM) and are reset only when a gear-up transition occurs as defined by the landing gear extension and retraction system.

Figure 6:
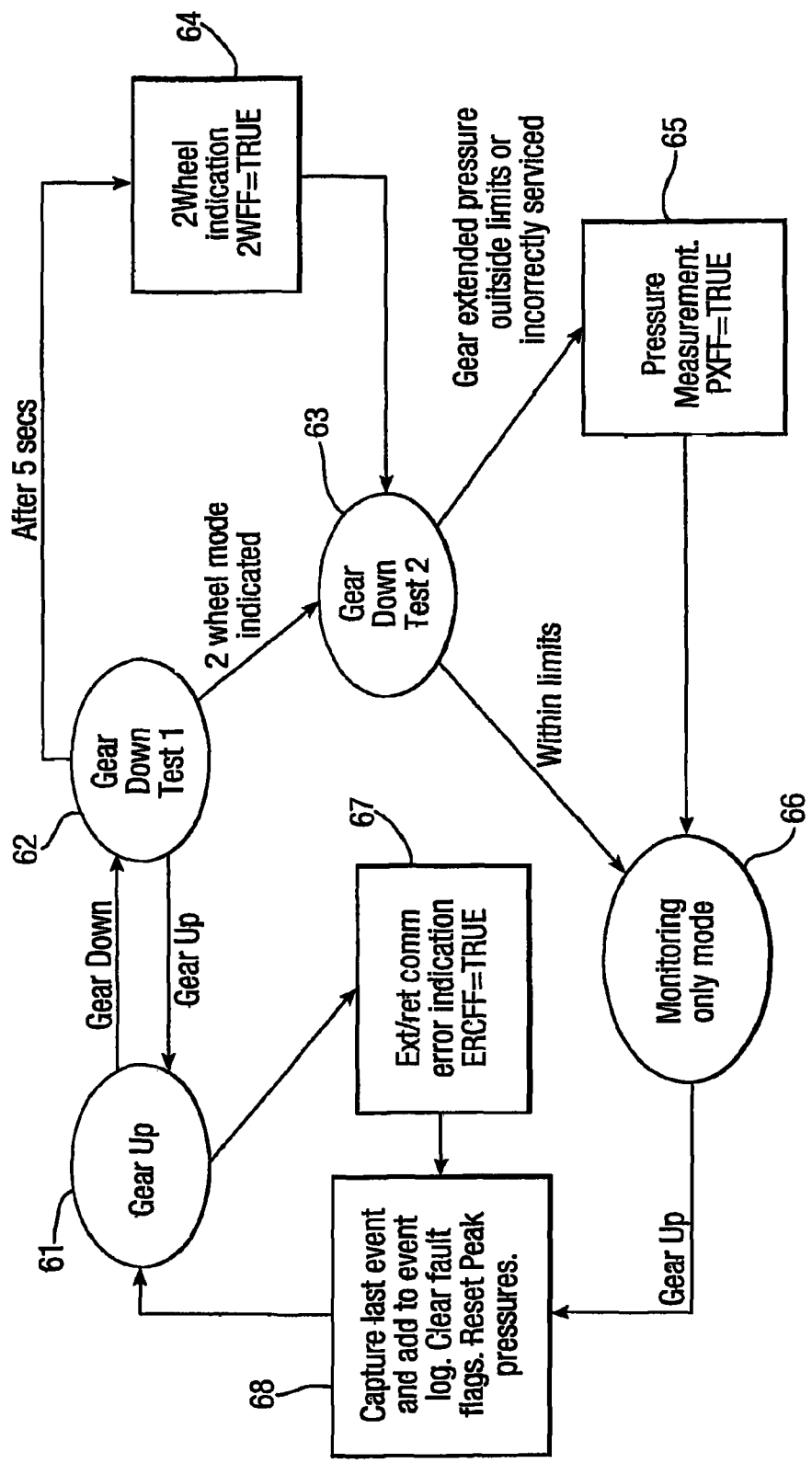
FIG. 6 is a state diagram representation of the operation of the electrical apparatus for monitoring landing gear load.

FIG. 6 represents the operation of the monitoring apparatus shown in FIG. 4, The load monitoring logic element represented by FIG. 5, which continues to operate every 20 milliseconds regardless of which operating state is active, contributes the functions represented by the element 66 of FIG. 6. The two processes of monitoring and fault detection should be considered as operating in parallel. The operating states allow the identification of events and confirm the operation of key inputs.

The procedure checks, at Test 1 (state 62), that the two-wheel/four-wheel mode input is indicating two-wheel on the approach with the landing gear extended. If there is no response after five seconds, a fault flag is generated (action 64). Test 2 (state 63) monitors the damping chamber pressure with the landing gear extended during the approach—this is the same as the break-out pressure of a spring curve and, if the measurement is outside the required limits, a fault is declared (action 65), but monitoring continues (action 66) as the fault may be due to mis-servicing. The collected peak values and fault flags are held in a non-volatile memory (action 68) and are not lost during power interruptions. An event means the values of peak loads and fault flags at that time and the event log is the history of the last ten events. An extended or retracted communications error (action 67) could be hardware-detected or time-out of, say, ten hours operation in that mode. On power-up of the monitoring apparatus, there is a need to check between the two-wheel and four-wheel mode and use a flight or ground indicator to initialise the monitoring apparatus in gear-up (state 61) and monitoring states.

The procedure checks at Test 1 that, after the landing gear is extended, a correct indication is received from the indicator as to whether the two-wheel or the four-wheel mode is current. If the indication is not correct, a fault flag is set to warn of a failure to indicate the two-wheel mode of operation. That fault flag is used to command the monitoring logic always to assume two-wheel mode. In test 2, a check is conducted of the expected damping chamber pressure and, if the check is failed, either the pressure input has failed or the landing gear has been mis-serviced. Again, a fault flag is set and monitoring continues because, even if the landing gear has been incorrectly serviced, the monitoring apparatus will correctly report the peak gear loads experienced during the landing. A further check may be implemented to ensure that there is correct communication between the extension and retraction system and the monitoring apparatus, in order to avoid the monitoring apparatus becoming stuck in one state.

Figure 7:
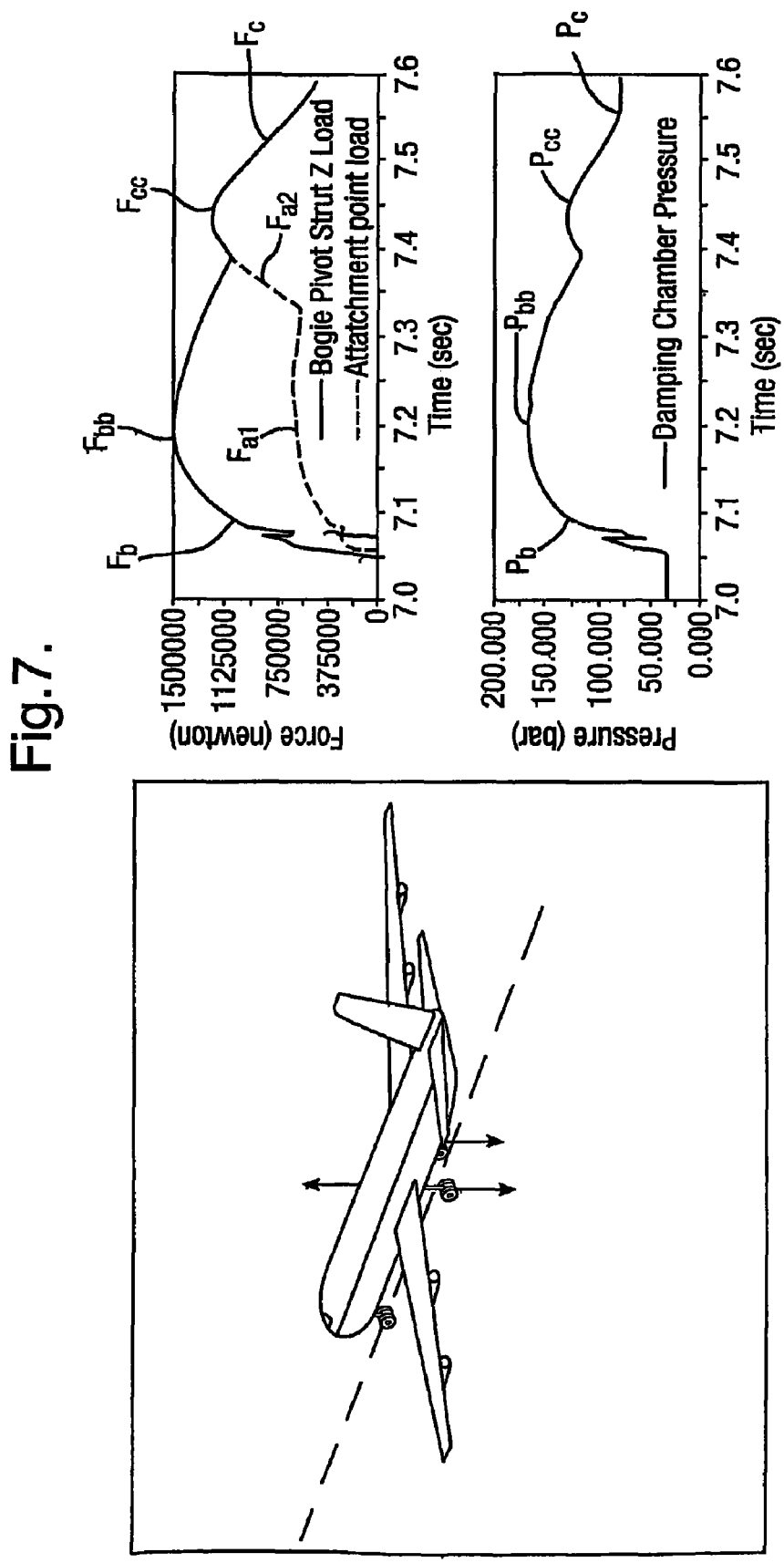
FIG. 7 is a graphical representation of a possible output signal pattern from the apparatus of either FIG. 4 or FIG. 5.

Referring to FIG. 7 of the accompanying drawings, the upper graph shows values for bogie pivot strut load against time for a four-wheel rocking bogie during a landing as $F_b$-$F_{bb}$-$F_{cc}$-$F_c$ and values for attachment point load as $F_{a1}$-$F_{a2}$-$F_{cc}$-$F_c$. The lower graph shows values for damping chamber oil pressure of a single stage shock absorber as $P_b$-$P_{bb}$-$P_{cc}$-$P_c$ for the same time scale as the upper graph for the four-wheel rocking bogie during the landing.

The value of the bogie pivot strut load $F_b$ rises from zero and shows a first maximum in the vicinity of the value $F_{bb}$ after which the value falls and then rises to a second maximum in the vicinity of the value $F_{cc}$, after which the value again falls. The value of the damping chamber oil pressure $P_b$ shows a corresponding variation to that of the bogie pivot strut load, rising to a first maximum in the vicinity of the value $P_{bb}$ after which the value falls and then rises to a second maximum in the vicinity of the value $P_{cc}$, after which the value again falls.

On the other hand, the value of the attachment point load $F_{a1}$ rises more or less steadily and then levels off after which the value again rises through a value $F_{a2}$ to a maximum in the vicinity of the value $F_{cc}$ of the bogie pivot strut load and, thereafter, is the same as the bogie pivot strut load $F_c$.

The presence of two maxima in the upper graph is evidence that the four-wheel rocking bogie is subject, on initial touchdown, to a two-wheel mode of operation and subsequently, to a four-wheel mode of operation. The first maximum of about $F_{bb}$ of the upper graph occurs in the two-wheel mode of operation of the landing gear and the second maximum of about $F_{cc}$ occurs in the four-wheel mode of operation. In the instance represented by FIG. 7, the first maximum exceeds the second maximum, but this is not always the case and the second maximum can exceed the first maximum.

The attachment point load in the two-wheel mode is significantly lower than the pivot point load in the two-wheel mode, because the articulation link 8 of FIG. 2 acts as a lever fulcrum of approximately 2:1 as a result of the landing gear geometry. In the subsequent four-wheel mode, the attachment point load and the bogie pivot load are equal, since the articulation link has no influence as regards loading at that time.

The information represented by FIG. 7 serves to indicate that, in respect of a four-wheel rocking bogie, the variation in oleo damping chamber pressure closely resembles the variation in the bogie pivot strut load, provided that the two-wheel and four-wheel modes are recognised as being two separate modes of operation.

Also, it is evident that, in the four-wheel mode alone, the attachment point load is substantially the same as the bogie pivot strut load.

The results represented by FIG. 7 relate to symmetrical landing conditions with the aircraft lift equal to its weight. The second maximum occurs in the four-wheel mode because there is still energy to be absorbed after the rotation of the bogie moving it from the two-wheel to the four-wheel mode. The first maximum, corresponding to the two-wheel mode is sensitive to descent rate while the second maximum increases substantially with reduction in lift-to-weight ratio. Furthermore, both maxima are sensitive to the roll rate at the moment of touchdown, a consequence being that a particular roll rate condition, at landing, in combination with lower descent rates than those specified in the Joint Airworthiness Requirements (JAR) design limits, could present conditions, in practice, of loads that exceed design limits.

The region of FIG. 7 between the two maxima corresponds to the transition mode, represented by the period between $t_1$ and $t_2$ of FIG. 3, when the bogie is moving from its two-wheel mode to its four-wheel mode.

Figure 8:
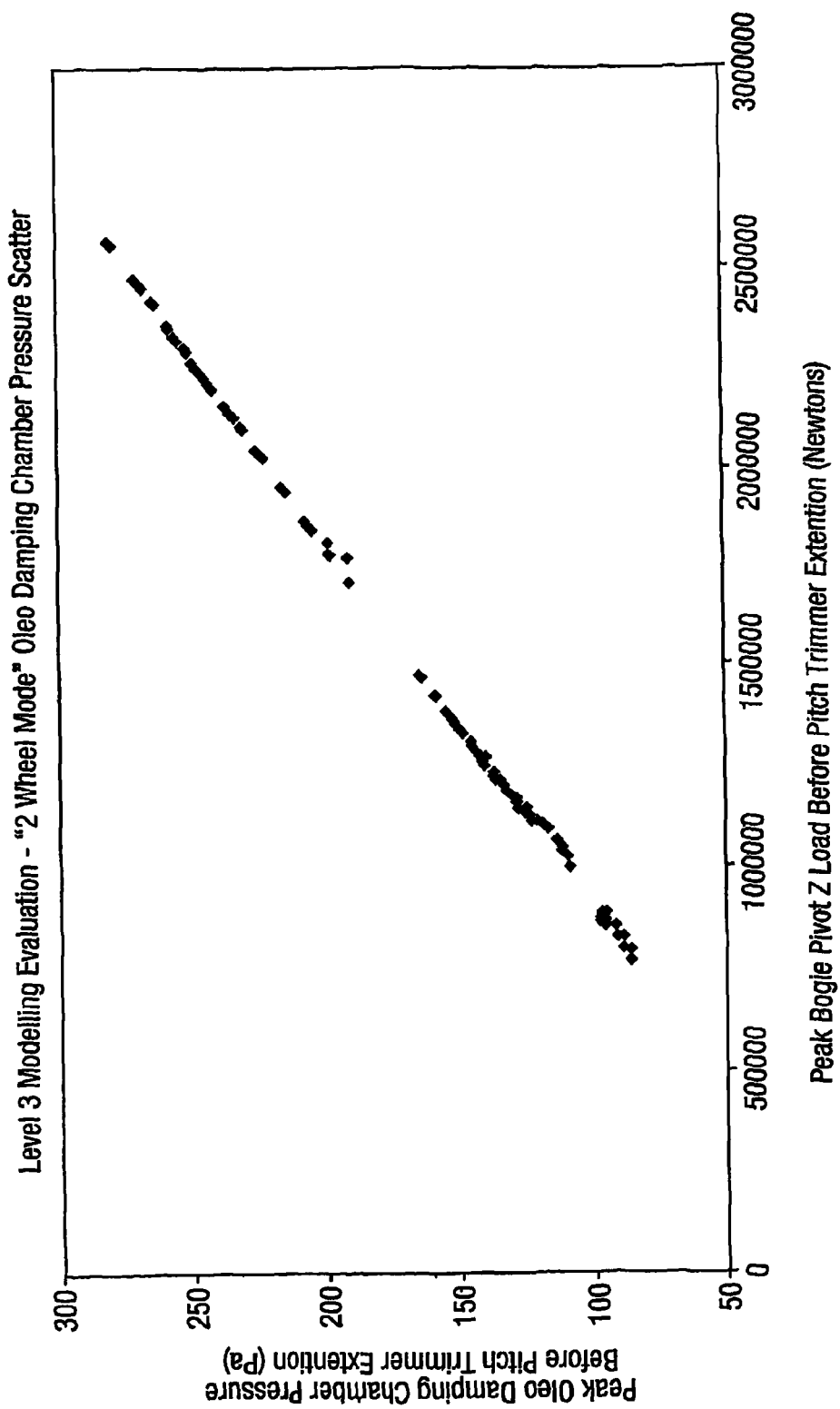
FIG. 8 shows the peak oleo damping chamber pressure in relation to peak bogie pivot load for a period when only two wheels of a four-wheel bogie are in contact with the ground during a landing.

The relationship between the peak bogie pivot load and the oleo damping chamber peak pressure is shown to be relatively linear in FIG. 8 of the accompanying drawings. Referring to FIG. 8, the peak oleo damping chamber pressure in relation to peak bogie pivot load is shown for the period between $t_0$ and $t_2$ of FIG. 3, that is, in the two-wheel mode. Departures from a truly linear relationship are seen as being related to friction effects due to side loads during the compression of the shock absorber. The friction loads, however, do not appear to exert a significant influence on the form of FIG. 8, principally because the peak loads occur when the inner main member 2 is sliding within the outer main member 3, in which condition there is substantially no static friction break-out error influencing the relationship. The relationship shown in FIG. 8 remains good for various touchdown speeds and indicates that there is no significant variation in the peak loads due to variations in drag.

Figure 9:
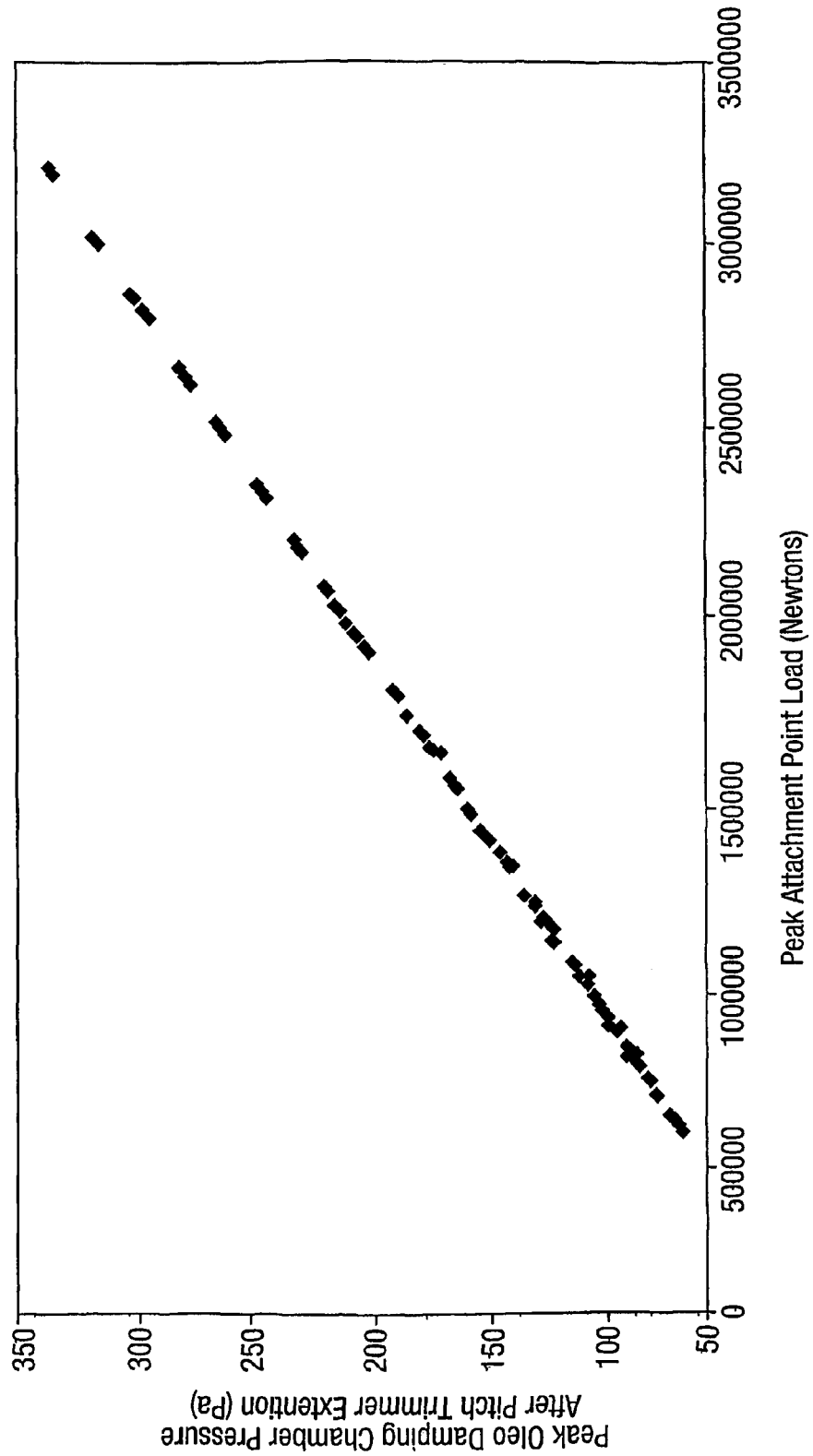
FIG. 9 shows the peak oleo damping chamber pressure in relation to the peak attachment point load after all four wheels of a four-wheel bogie are in contact with the ground during a landing.

Referring to FIG. 9 of the accompanying drawings, the peak oleo damping chamber pressure in relation to peak attachment point load is shown for the period beyond $t_2$ of FIG. 3, that is, in the four-wheel mode. The peak bogie pivot load and the peak attachment point load are substantially the same in the four-wheel mode, as is shown in FIG. 7, from which it follows that the relationship represented by FIG. 9 is also the relationship between the peak oleo damping chamber pressure and the peak bogie pivot load.

The information provided by FIGS. 7 to 9 serves to indicate that there is a consistent relationship between the peak oleo damping chamber pressure and peak bogie pivot load along the axis of the shock absorber. Approximate values for the peak attachment load and the articulation link load could be derived from the peak bogie pivot load, in the two-wheel mode, on the basis of landing gear geometry.

Figure 10:
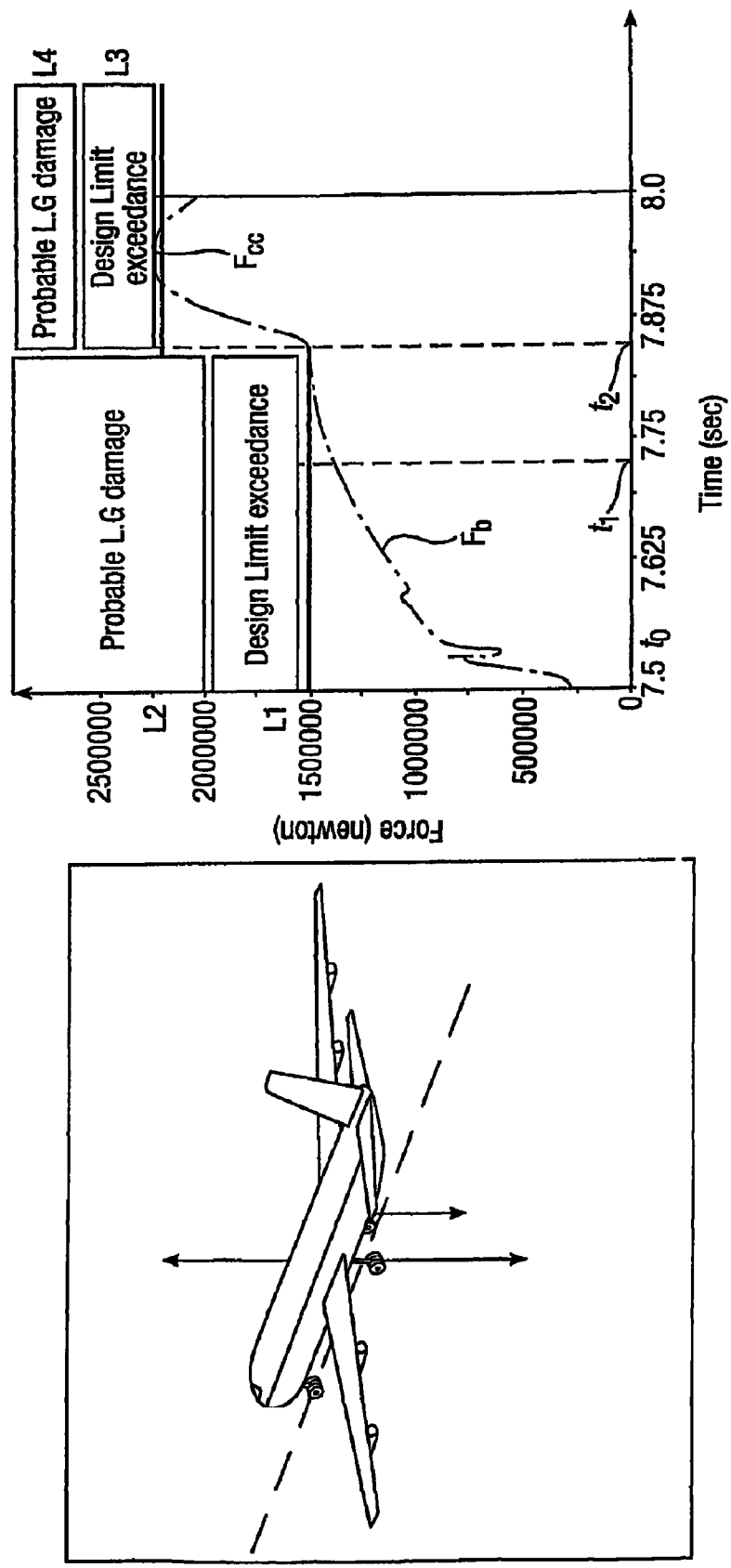
FIG. 10 shows an alternative pattern for landing load variation to that of FIG. 7 in relation to set threshold limits.

FIG. 10 of the accompanying drawings shows a graph representing the variation of values of bogie pivot strut load $F_b$-$F_{cc}$, during a landing, combined with the load limit values L1, L2, L3 and L4 in relation to the time periods $t_0$ to $t_2$ and beyond $t_2$, identified in FIG. 3. The graph of FIG. 10 is the same type as that of FIG. 7 but for different landing conditions.

FIG. 10 is an example of landing load conditions where the descent rate is such that the landing gear load at touch-down remains below L2, resulting in a non-damaging peak load in the two-wheel mode, yet the peak load occurring in the four-wheel mode is much higher and, in fact, exceeds, the bookcase limit L3 of a 0.5 g turn In respect of FIG. 10, the indicated limits are:
a peak bogie pivot load L1>1.5 MN corresponding to a 10 ft/sec descent rate at maximum landing weight (MLW), symmetrical landing with lift equal to weight.
a peak bogie pivot load L2>1.9 MN corresponding to a 12 ft/sec descent rate at MLW, symmetrical landing with lift equal to weight.
a peak attachment point load L3>2.14 MN corresponding to a 0.5 g turn static load limiting case.

The load limit values L1 and L2 are relevant only in the two-wheel mode. The load limit value L3 serves to generate a warning if the static load limit of a 0.5 g turn is exceeded dynamically as a result of a combination of factors including, for example, possible combinations of a non-symmetrical landing, a bounced landing and low lift-to-weight ratios. The load limit value L3 is relevant only in the four-wheel mode, the attachment load being the same as the bogie pivot load in that case, as can be seen in FIG. 7.

Figure 11:
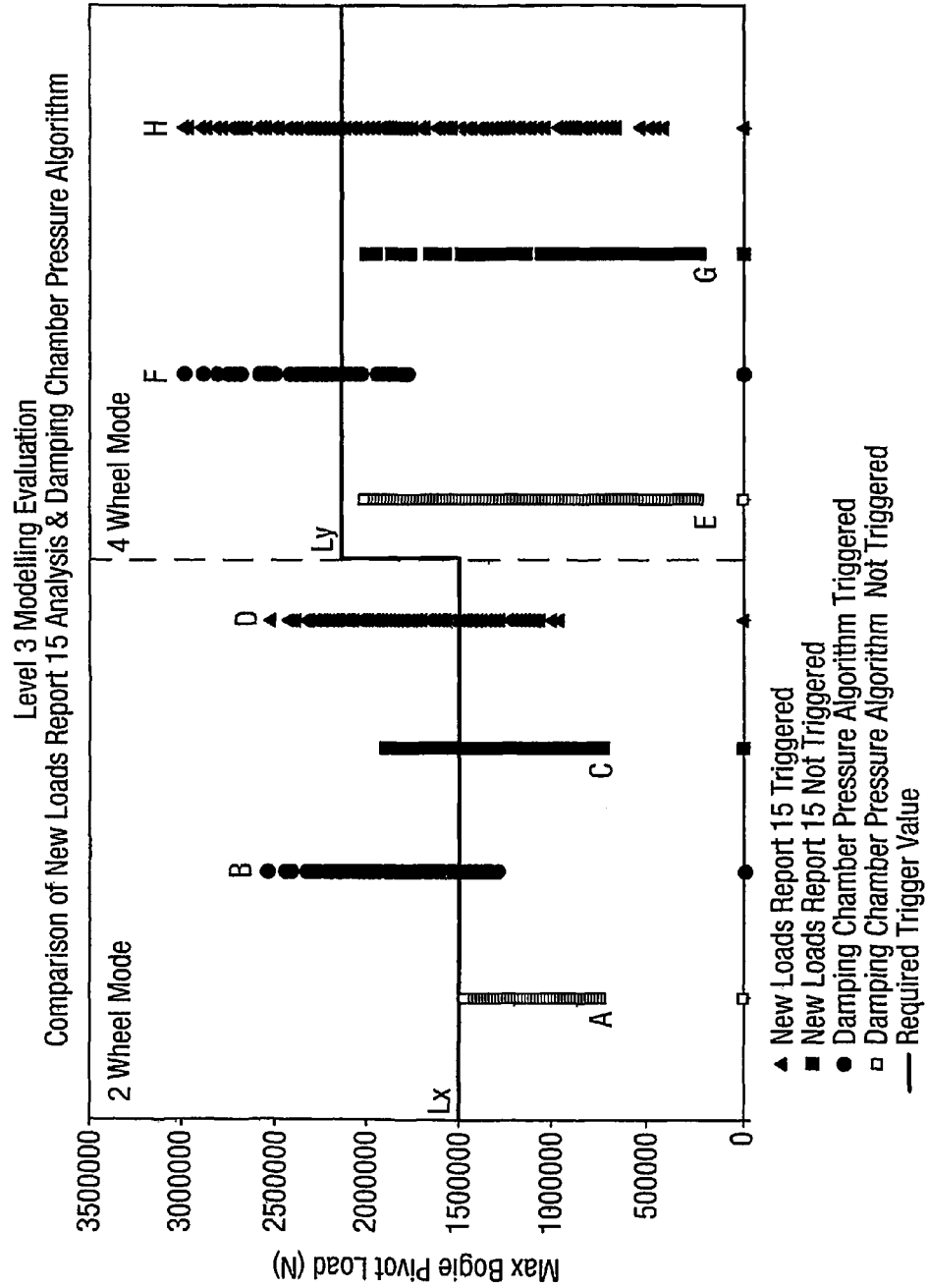
FIG. 11 is a diagrammatic representation of results from the landing gear load monitor of the invention compared with triggering events originating from modelling the descent rate of the aircraft or the acceleration of the aircraft centre of gravity during landing.

Referring to FIG. 11 of the accompanying drawings, graphical representations of the results obtained from computerised models representing, respectively, the landing gear load monitoring device (bars A, B, E & F) and a triggering event (bars C, D, G & H). The bar A represents the instances in which the landing gear monitor was not triggered, for a range of landing gear loads, for the landing gear in the two-wheel mode. In respect of the bar A, where there was no triggering of the landing gear monitor, the loads were all below the set threshold $L_x$.

The bar B represents the instances in which the landing gear monitor was triggered, for a range of landing gear loads, for the landing gear in the two-wheel mode. In respect of the bar B, the landing gear load monitor was triggered for all loads exceeding the set threshold $L_x$ and by some loads immediately below the set threshold $L_x$. The triggering of the landing gear monitor is seen as safe, since all loads exceeding the set threshold $L_x$ were detected. The triggering of the landing gear monitor by some loads below the set threshold $L_x$ are incorrect responses and are seen as being on the safe side in relation to incorrect triggering.

Note that the triggering of the landing gear monitor, as represented by the bars A and B, is such that all conditions of excessive load are detected and there is a small range of loads immediately below the set threshold $L_x$ in which there is incorrect triggering.

The bar C represents the instances in which the Flight Data Analysis was not triggered, for a range of landing gear loads, for the landing gear in the two-wheel mode. In respect of the triggering events, there are failures, represented by the part of the bar C above the set threshold $L_x$, to report some loads in excess of the set threshold $L_x$. These failures in reporting are seen as being on the unsafe side of incorrect reporting (based on the chosen thresholds for this modelling example), since instances of loads exceeding the set threshold are not being reported.

The bar D represents the instances in which the Flight Data Analysis was triggered, for a range of landing gear loads in the two-wheel mode. There is reporting of loads in excess of the set threshold $L_x$ but, along with that result, a significant number of erroneous reports of excessive loads where the loads are slightly below and, also, significantly below the set threshold $L_x$.

Note that in the triggering events, as represented by the bars C and D, not all conditions of excessive load are detected and there is a significant range of loads below the set threshold $L_x$ in which there is incorrect reporting The bar E represents the instances in which the landing gear monitor was not triggered, for a range of landing gear loads, for the landing gear in what is recognised by the landing gear load monitoring device as the four-wheel mode. In respect of the bar E, where there was no triggering of the landing gear monitor, the loads were all below the set threshold $L_y$.

The bar F shows the instances in which the landing gear monitor was triggered, for a range of landing gear loads, for the landing gear in the four-wheel mode. In respect of the bar F, the landing gear load monitor was triggered for all loads exceeding the set threshold $L_y$ and by some loads immediately below the set threshold $L_y$. The triggering of the landing gear monitor is seen as safe, since all loads exceeding the set threshold $L_y$ are detected. The triggering of the landing gear monitor by some loads below the set threshold $L_y$ are incorrect responses and are seen as being on the safe side in relation to incorrect triggering.

The bar G represents the instances in which the Flight Data Analysis was not triggered, for a range of landing gear loads, for the landing gear in the four-wheel mode. In respect of the triggering events, there are no failures (no part of the bar G is above the set threshold $L_y$) to report some loads in excess of the set threshold $L_y$. In respect of the triggering events represented by the bar G, the results are comparable to those for the landing gear load monitor in that only loads below the set threshold $L_y$ are ignored.

The bar H represents the instances in which the Flight Data Analysis was triggered, for a range of landing gear loads in the four-wheel mode. There is reporting of loads in excess of the set threshold $L_y$ but, along with that result, a significant number of erroneous reports of excessive loads where the loads are slightly below and, also, significantly below the set threshold $L_y$.

The triggering events do not distinguish between the two-wheel and four-wheel modes and it is evident that, as represented by the part of the bar C above the set threshold $L_x$, the triggering events may be expected to fail to report instances where a safe-load threshold has been exceeded. As represented by the bar H, the triggering events may be expected to report a significant number of instances of a landing load threshold being exceeded although the landing gear loads are below the set threshold.

A triggering event failure to report a set load threshold being exceeded, as represented by bar C, is a matter of concern from the safety aspect. In a significant number of instances the triggering events indicate a set load threshold being exceeded where no set load-threshold has been exceeded, as represented by the bar H, resulting in unnecessary maintenance action, representing unnecessary grounding of an aircraft with accompanying cost penalties.

In contrast, the landing gear load monitor reports all instances of a set load threshold being exceeded, as represented by the bars B and F, with a small number of indications of a set load threshold being exceeded where no set load threshold has been exceeded, as represented by the bars B and F.

The landing gear load monitor provides a solution to the problem of detecting a hard landing quickly and reliably in aircraft operations. One landing gear monitor per landing gear is, of course, required.

In relation to the application of a landing gear monitor to an articulated landing gear, by detecting when the bogie is in the two-wheel mode and when the bogie is in four-wheel mode, respective thresholds are set for to the two modes and the peak landing loads for the two modes are monitored separately. The detection method is effectively a direct load measurement through damping chamber pressure sensing and is independent of key variables in relation to the mode of landing including, for example, rolling, lift-to-weight ratio, mass and descent velocity. If a set threshold is exceeded, then potential landing gear damage has occurred and the aircraft should remain on the ground (AOG) until the appropriate maintenance action has been taken. If no set threshold has been exceeded, then it is probable that no damaging vertical load has been experienced by the landing gear.

The landing gear monitoring device disclosed above includes the following features:
  provision of a GO/NO GO decision on landing gear operability after a triggering event or a suspected hard landing.
  direct peak load measurement of each landing gear during landing, since a landing gear monitor operates with each landing gear.
  separate load measurements and thresholds for two-wheel and four-wheel modes during a landing targeted at different components of the landing gear.
  so operates that no single failure is likely to result in an erroneous indication that damage has not occurred.
  servicing check on nitrogen pressure.

warning of a vertical load threshold being exceeded during ground maneuvering.

may be integrated into a landing gear extension/retraction system or enhanced oleo pressure monitoring system.

The following additional features may be included:

capturing and retaining a history of peak loads during landings.

capturing and retaining occurrences of the lower one of two set thresholds being exceeded.

integration into an overall ATA 32 health monitoring system.

The above disclosure relates to a rocking bogie four-wheel landing gear including a single-stage oleo in which there is access to the damping chamber for monitoring damping chamber pressure.

Another form of landing gear is a four-wheel non-articulated bogie in which there is no articulation link.

In this form of landing gear, the compression of the oleo during the two-wheel mode is expected to be small, depending on the reaction force of the pitch trimmer. It is anticipated that the logic arrangement of FIG. 5 would be suitable for a single-stage oleo arrangement, possibly with minor modification dependent on the specific form of the landing gear.

For a landing gear having only two wheels, for example the nose landing gear in a large aircraft or, possibly, a main landing gear in a small aircraft, including a single-stage oleo, there is no need for monitoring wheel modes, since there is no four-wheel mode, and the peak damping chamber pressure indicates the maximum landing gear load. This form of landing gear is generally known as a single-stage oleo diabolo landing gear.

For an alternative form of nose-wheel landing gear, say, having a two-stage oleo, there is again no need for monitoring wheel modes, but special arrangements are required in order to obtain damping chamber access for measuring damping chamber pressure, since there is more than one damping chamber and the chambers do not provide straightforward access. This form of landing gear is generally known as a two-stage oleo diabolo landing gear.

The landing gear monitoring device disclosed herein is not seen as a replacement for the Flight Data Analysis and, rather, should augment the Flight Data Analysis with data enabling a more accurate assessment of the landing gear condition following a landing.

The invention claimed is:

1. A landing gear monitor for aircraft landing gear including a plurality of pairs of wheels on a bogie, including:

a pressure sensor which, in use, is so located in the landing gear main strut as to sense the pressure of the hydraulic fluid in the landing gear main strut, the pressure sensor providing an output electrical signal corresponding to the pressure it senses, a first landing gear sensor for sensing and signalling that the landing gear is lowered, a second landing gear sensor for sensing and signalling the on-set of a first mode of operation of the bogie when the bogie is in the trail position such that the first of the plurality of pairs of wheels on the bogie will contact the ground first, a third landing gear sensor for sensing and signalling the on-set of a second mode of operation of the bogie when a second of the plurality of pairs of wheels on the bogie, in addition to the first pair of wheels, are fully engaging with the ground, a signal processing unit connected to receive the signals from all of the sensors and, following the receipt of a signal from the first landing gear sensor indicating that the landing gear is lowered, the signal processing unit, in operation, evaluating the signals from the pressure sensor in relation to, respectively, the first mode and the second mode, and providing a main output signal indicating the results of the evaluation and an output section connected to receive the main output signal from the signal processing unit, for providing a representation of the output signal from the signal processing unit in relation to, respectively, the first mode and the second mode.

2. A landing gear monitor as claimed in claim 1, wherein the signal processing unit includes internally stored information representing a first limiting magnitude for the signal from the pressure sensor during operation of the landing gear in the first mode, and the signal processing unit provides a first additional output signal indicative of the magnitude of the signal from the pressure sensor during the first mode relative to the first limiting magnitude.

3. A landing gear monitor as claimed in claim 2, wherein the signal processing unit includes internally stored information representing a second limiting magnitude, exceeding the first limiting magnitude, for the signal from the pressure sensor during operation of the landing gear in the first mode, and the signal processing unit provides a second additional output signal indicative of the magnitude of the signal from the pressure sensor during the first mode relative to the second limiting magnitude.

4. A landing gear monitor as claimed in claim 3, wherein the signal processing unit so operates as to capture the peak value of the signal from the pressure sensor in the first mode, and the output section so operates as to provide a representation of the peak value of the signal from the pressure sensor in the first mode in relation to the first and second limiting magnitudes.

5. A landing gear monitor as claimed in claim 2, wherein the limiting magnitudes are derived from a computer model of the landing gear.

6. A landing gear monitor as claimed in claim 1, wherein the signal processing unit includes internally stored information representing a third limiting magnitude for the signal from the pressure sensor during operation of the landing gear in the second mode, and the signal processing unit provides a third additional output signal indicative of the magnitude of the signal from the pressure sensor during the second mode relative to the third limiting magnitude.

7. A landing gear monitor as claimed in claim 1, wherein the signal processing unit includes internally stored information representing a fourth limiting magnitude, exceeding the third limiting magnitude, for the signal from the pressure sensor during operation of the landing gear in the second mode, and the signal processing unit provides a fourth additional output signal indicative of the magnitude of the signal from the pressure sensor during the second mode relative to the fourth limiting magnitude.

8. A landing gear monitor as claimed in claim 7, wherein the signal processing unit so operates as to capture the peak value of the signal from the pressure sensor in the second mode, and the output section so operates as to provide a representation of the peak value of the signal from the pressure sensor in the second mode in relation to the third and fourth limiting magnitudes.

9. A landing gear monitor as claimed in claim 1, wherein the signal processing unit so operates as to capture the peak value of the signal from the pressure sensor in the first mode.

10. A landing gear monitor as claimed in claim 1, wherein the signal processing unit so operates as to capture the peak value of the signal from the pressure sensor in the second mode.

11. A landing gear monitor as claimed in claim 1, wherein the signal processing unit, in operation, provides a main output signal, from the signal from the signal processing unit, representing the load to which the landing gear main strut is subjected.

12. A landing gear monitor as claimed in claim 11, wherein the signal processing unit includes a first lookup table relating the magnitude of the signal from the pressure sensor to the load to which the landing gear is subjected in the first mode and the main output signal from the signal processing unit is derived from the information provided by the first look-up table.

13. A landing gear monitor as claimed in claim 11, wherein the signal processing unit includes a second look-up table relating the magnitude of the signal from the pressure sensor to the load to which the landing gear is subjected in the second mode and the main output signal from the signal processing unit is derived from the information provided by the second look-up table.

14. A landing gear monitor as claimed in claim 1, wherein the signal processing unit samples the signal from the pressure sensor at intervals of about 20 milliseconds.

15. A landing gear monitor as claimed in claim 1 for and operable with a four-wheel bogie.

16. A landing gear monitor as claimed in claim 1, wherein a landing gear articulation sensor performs the functions of the second and third landing gear sensors.

17. An aircraft landing gear including a landing gear monitor as claimed in claim 1.

18. An aircraft including a landing gear monitor as claimed in claim 1.

19. A computer program for operating a landing gear monitor as claimed in claim 1.

20. A method of operation of a landing gear monitor for aircraft landing gear including a plurality of pairs of wheels on a bogie, including: sensing the pressure of the hydraulic fluid in the landing gear main strut and providing an output electrical signal corresponding to the sensed pressure, sensing and signalling that the landing gear is lowered, sensing and signalling when the bogie is in the trail position, the condition of the bogie being in the trail position being identified hereinafter as the first mode, sensing and signalling when a second of the plurality of pairs of wheels on the bogie, in addition to the first pair of wheels, fully engages with the ground, the condition of a first and a second of the plurality of pairs of wheels on the bogie fully engaging with the ground being identified hereinafter as the second mode, evaluating the signals from the sensing of the pressure of the hydraulic fluid in relation to, respectively, the first mode and the second mode, and providing a main output signal indicating the results of the evaluation and providing a representation of the main output signal in relation to, respectively, the first mode and the second mode.

21. A landing gear monitor programmed to operate in accordance with a method as claimed in claim 20.

* * * * *